United States Patent [19]

Bogar

[11] Patent Number: 4,778,141
[45] Date of Patent: Oct. 18, 1988

[54] FISHING ROD HOLDER

[76] Inventor: Earl M. Bogar, P.O. Box 4152, Houston, Tex. 77210

[21] Appl. No.: 102,719

[22] Filed: Sep. 30, 1987

[51] Int. Cl.$^4$ .............................................. A01K 97/10
[52] U.S. Cl. ..................................... 248/538; 43/21.2
[58] Field of Search ............... 248/538, 511, 534, 512, 248/513, 539; 43/21.2, 27.4

[56] References Cited

U.S. PATENT DOCUMENTS

| | | | |
|---|---|---|---|
| 4,017,998 | 4/1977 | Dumler | 43/21.2 |
| 4,375,731 | 3/1983 | Budd | 43/21.2 |
| 4,485,579 | 12/1984 | Hawie | 248/538 X |
| 4,565,025 | 1/1986 | Behrle | 248/538 X |
| 4,578,891 | 4/1986 | Murray | 43/21.2 |
| 4,624,069 | 11/1986 | Schneider | 43/21.2 |

OTHER PUBLICATIONS

"Goldbergs' Marine", Accessory Catalog published Jan. 16, 1981.

Primary Examiner—J. Franklin Foss
Attorney, Agent, or Firm—Fleit, Jacobson, Cohn & Price

[57] ABSTRACT

A vertically elongated body is provided defining a longitudinally extending and upwardly opening handle end receiving socket therein. The socket includes a long upper end portion and a relatively short lower end portion and the upper and lower end portions include corresponding transverse long X axes and short Y axes. Side walls of the socket defining the limits of the X axis of the upper end portion are downwardly divergent defining an included angle of approximately 20° and the side walls of the socket defining the X axis of the lower end portion of the socket are downwardly divergent and define an included angle of approximately 20°, the socket including a generally circular cross-section in an interlineation zone between the upper and lower end portions of the socket. Further, the lower end portions of the socket include structure effectively blocking movement of a fishing rod handle downwardly therethrough.

10 Claims, 1 Drawing Sheet

FISHING ROD HOLDER

BACKGROUND OF THE INVENTION

1. Field of Invention

This invention relates to a holder defining an upwardly opening socket for downwardly receiving the handle end of a fishing rod therein when the fishing rod is supported from a boat, primarily during trolling operations. The holder includes mounting structure for fixed mounting relative to support structure on an attendant boat and is constructed in a manner to allow ready removal of an associated fishing rod handle from the holder, insertion of the fishing rod handle in the holder and reliable support of the fishing rod during trolling operations.

2. Description of Related Art

Various different forms of fishing rod holders including some of the general structural and operational features of the instant invention heretofore have been provided. Examples of these previously known forms of holders are disclosed in U.S. Pat. Nos. 1,448,808, 3,142,936, 3,290,816, 3,902,269, 3,964,706, 4,017,998, 4,062,299, 4,357,731 and 4,517,716. However, these previously known forms of holders do not include the overall combination of structural features of the instant invention.

SUMMARY OF THE INVENTION

The fishing rod holder of the instant invention has been specifically designed to provide a reliable support for an upstanding fishing rod during a trolling operation, even when the associated boat may be rolling, pitching and yawing.

The main object of this invention is to provide a fishing rod holder which will comprise a reliable support for removably supporting a fishing rod holder during a trolling operation.

Another object of this invention is to provide a fishing rod holder which may be readily mounted from various portions of an associated boat.

Still another important object of this invention is to provide a fishing rod holder which will allow the handle end of the fishing rod to be readily removed therefrom and inserted thereinto.

A further object of this invention is to provide a fishing rod holder which may be operative as desired in conjunction with fishing rods having different types of handle ends.

Yet another important object of this invention is to provide a fishing rod holder which will function to prevent an unattended fishing rod from being accidentally dislodged therefrom, even during erratic rolling, pitching and yawing movements of an associated boat.

A final object of this invention to be specifically enumerated herein is to provide a rod holder which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
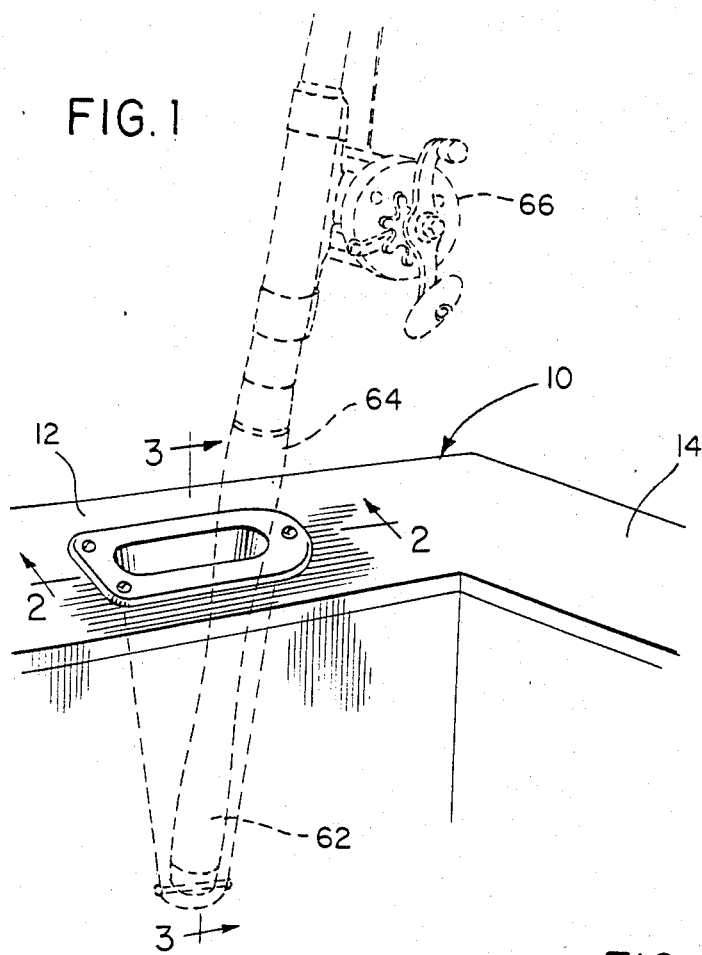
FIG. 1 is a fragmentary perspective view of the aft starboard gunnel portion of a boat from which a fishing rod holder constructed in accordance with the present invention is mounted, portions of the fishing rod holder and an attendant fishing rod handle end portion being illustrated in phantom lines.
Figure 3:
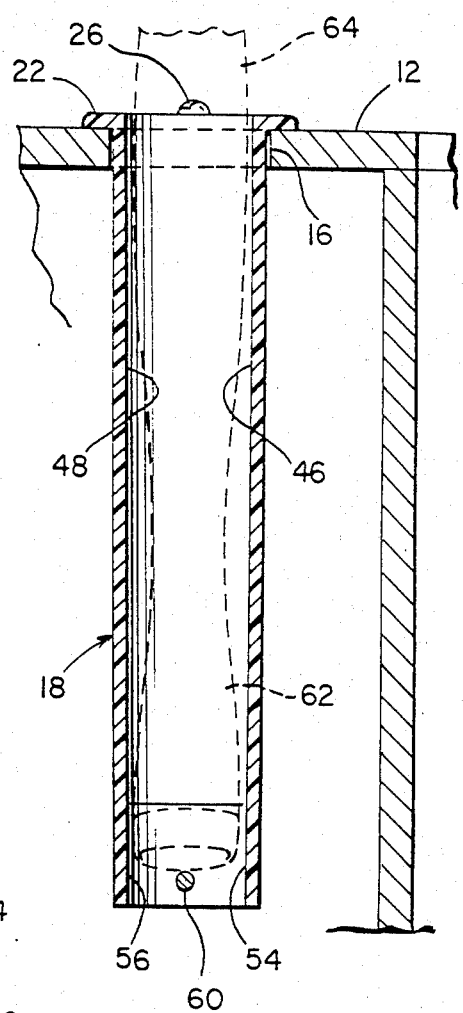
FIG. 3 is an enlarged fragmentary vertical sectional view taken substantially upon a plane indicated by the section line 3—3 of FIG. 1.

Referring now more specifically to the drawings, the numeral 10 generally designates a typical boat including a starboard gunnel 12 and a transom 14. The gunnel 12 includes an upstanding oblong opening 16 formed therein and the holder of the instant invention, generally referred to by the reference numeral 18, projects through the opening 16 and is secured to the gunnel 12.

The holder 18 includes an upstanding tubular body 20 which may be cast in metal or molded of plastic. With the increased availability of strong and durable plastics, it is proposed that the holder 18 will be, in most instances, constructed of plastic.

The body 20 includes an upper outwardly projecting peripheral mounting flange 22 provided with mounting fastener apertures 24 spaced about the flange 22 and suitable fasteners 26 are secured through the apertures 24 and to the gunnel 12 for securing the holder 18 to the gunnel 12 with the major portion of the body 20 of the holder 18 projecting downwardly through the opening 16 an the mounting flange 22 downwardly abutted against the upper surface of the gunnel 12.

The body 20 defines an upwardly opening socket 26 including upper and lower end portions 28 and 30 and a delineation zone 32 between the lower and upper extremities of the upper and lower end portions 28 and 30, respectively.

The upper and lower end portions 28 and 30 include corresponding large X axes 38 and 40 and corresponding small Y axes 42 and 44. The side walls 46 and 48 defining the limits of the Y axis 42 of the upper end portion 28 are slightly downwardly convergent and the opposite side walls 50 and 52 defining the limits of the X axis 38 of the upper end portion 28 are considerably more downwardly convergent, see FIG. 2. Thus, the side walls 46, 48 and 50, 52 are downwardly convergent toward the delineation zone 32, which zone is at least generally circular in cross-section. However, the side walls 54 and 56 defining the limits of the Y axis 44 of the lower end portion 30 are substantially parallel while the opposite side walls 58 and 60 defining the limits of the X axis 40 of the lower end portion 30 are downwardly divergent. Further, the side walls 50, 52 and 56, 58 are transversely rounded.

The lower end of the lower end portion 30 is effectively closed by a transverse pin or shaft 60 secured through the lower end of the body 20 along the X axis 40 and the diameter of the delineation zone 32 is slightly greater than the diameter of the lower handle end 62 of an associated fishing rod 64. The handle end 62 is removably downwardly receivable within the socket 26 with the lower terminal end of the handle end 62 abutted against the pin or shaft 60. The X axes 38 and 40 extend longitudinally of the boat 10. Thus, the fishing rod 64 may be inclined upwardly and rearwardly during trolling operations and when it is thought a fish has made a strike, the upper end of the fishing rod 64 may be swung sharply rearwardly to the limit defined by the forward portion of the socket 26 in order to insure that the hook is set. Then, the fishing rod 64 may be removed from the socket 26 and the reel 66 on the fishing rod 64 may be used to reel in the fishing line.

Figure 2:
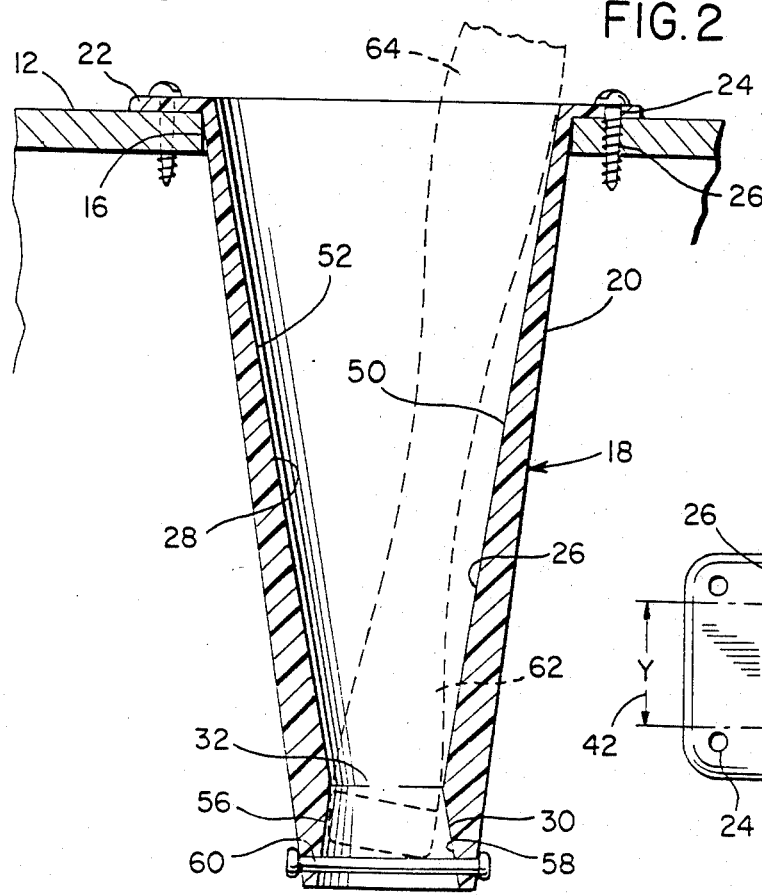
FIG. 2 is an enlarged fragmentary vertical sectional view taken substantially upon the plane indicated by the section line 2—2 of FIG. 1.
Figure 4:
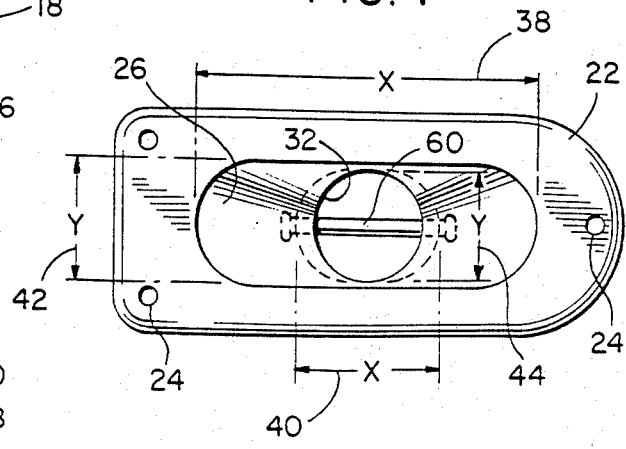
FIG. 4 is an enlarged top plan view of the fishing rod holder.

Inasmuch as the side walls 56 and 58 are downwardly divergent, it may be seen from FIG. 2 of the drawings that a pull on the upper end portion of the rod 64 to the rear (right) cannot accidentally dislodge the handle end 62 from the lower end portion 30 of the socket 26. Thus, the fishing rod 64 is supported from the holder 18 in a secure manner, even though the boat 10 may be experiencing heavy rolling, pitching and yawing movements. Inasmuch as the side walls 46 and 48 are substantially parallel, rolling and yawing movements of the boat 10 are ineffective to dislodge the handle end 62 from the socket 26.

The secure manner in which the holder 18 is capable of removably supporting the fishing rod 64 therefrom even allows the holder 18 to be mounted on as much as a 45° upwardly and laterally outwardly inclined position on the boat 10. This is because of the downward divergency of the side walls 56 and 58 of the lower end portion 30 of the socket 26. Further, the holder 18 is constructed in a manner whereby the fishing rod handle end 62 may be removably supported therefrom without damage to the handle end 62.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A holder for a fishing rod, said holder including an upstanding tubular body having upper and lower ends and including mounting means for secure mounting of said holder from a support structure, said holder defining an elongated upwardly opening fishing rod handle end receiving socket therein, said socket including upper and lower end portions, each including corresponding transverse X and Y axes extending in relatively right angularly disposed directions, said socket upper and lower end portions being upwardly and downwardly flared, respectively, with the width of the upper extremity of said socket upper portion, measured along the X axis thereof, being at least twice the width of the upper extremity of said socket upper portion measured along the Y axis thereof, the walls of said socket upper end portion defining the extremities of said upper end portion X axis converging downwardly toward the upper extremity of said socket lower end portion, the walls of said socket lower end portion defining the X axis thereof diverging downwardly away from the lower extremity of said socket upper end portion, and closure means closing the lower portion of said socket lower end portion against movement of a fishing rod handle end downwardly therethrough, the walls of said socket defining the extremities of said Y axes of said socket upper and lower end portions being generally parallel.

2. The holder of claim 1 wherein the vertical extent of said socket upper end portion is at least five times the effective vertical extent of said socket lower end portion disposed above said closure means.

3. The holder of claim 2 wherein said closure means includes a transverse rod secured through said body generally along the X axis of said socket lower end portion.

4. The holder of claim 1 wherein said socket upper and lower end portions taper toward a delineation zone defining lower and upper extremities of said socket upper and lower end portions, respectively, and said delineation zone is at least generally circular in transverse cross-section.

5. The holder of claim 4 wherein said socket upper and lower end portions, above and below said delineation zone, are at least generally rounded oblong in transverse cross-section.

6. The holder of claim 5 wherein the vertical extent of said socket upper end portion is at least five times the effective vertical extent of said socket lower end portion disposed above said closure means.

7. The holder of claim 6 wherein said closure means includes a transverse rod secured through said body generally along the X axis of said socket lower end portion.

8. The holder of claim 1 wherein said body is constructed of plastic.

9. The holder of claim 1 wherein said mounting means includes an outwardly projecting mounting flange extending peripherally about the upper end of said tubular body.

10. The holder of claim 1 wherein the opposite side walls of said socket upper end portion defining the limits of the Y axis of said socket upper end portion are slightly downwardly divergent.

* * * * *